(12) United States Patent
Hudson et al.

(10) Patent No.: US 10,392,878 B2
(45) Date of Patent: Aug. 27, 2019

(54) CONTROL SYSTEM FOR ACTUATING DRILL PIPE RACK

(71) Applicant: Caterpillar Global Mining Equipment LLC, Denison, TX (US)

(72) Inventors: Charles Taylor Hudson, Sherman, TX (US); Christopher J Demick, Howe, TX (US); Yuvaraj Shanmugam, Chennai (IN)

(73) Assignee: Caterpillar Global Mining Equipment LLC, Denison, TX (US)

( * ) Notice: Subject to any disclaimer, the term of this patent is extended or adjusted under 35 U.S.C. 154(b) by 107 days.

(21) Appl. No.: 15/644,885

(22) Filed: Jul. 10, 2017

(65) Prior Publication Data

US 2019/0010769 A1    Jan. 10, 2019

(51) Int. Cl.
*E21B 19/14* (2006.01)
*F15B 11/22* (2006.01)
*F16K 31/122* (2006.01)
*G05D 16/10* (2006.01)

(52) U.S. Cl.
CPC ............ *E21B 19/146* (2013.01); *F15B 11/22* (2013.01); *F16K 31/122* (2013.01); *G05D 16/10* (2013.01)

(58) Field of Classification Search
CPC ........ E21B 19/14; E21B 19/146; F15B 22/11; F15B 11/163; F15B 2211/31541
See application file for complete search history.

(56) References Cited

U.S. PATENT DOCUMENTS

| 6,173,639 | B1* | 1/2001 | A'Hearn | F15B 11/003 91/437 |
| 8,425,171 | B2 | 4/2013 | Asbjørn et al. | |
| 8,936,424 | B1 | 1/2015 | Canyon et al. | |
| 2003/0226248 | A1* | 12/2003 | McGuffin | E21B 19/24 29/525.01 |
| 2010/0199812 | A1* | 8/2010 | Richardson | E21B 19/164 81/57.11 |
| 2014/0338973 | A1* | 11/2014 | Taylor | E21B 19/146 175/24 |
| 2015/0144325 | A1* | 5/2015 | Heidecke | E21B 19/00 166/77.4 |
| 2018/0291696 | A1* | 10/2018 | Amerson | E21B 19/18 |

* cited by examiner

*Primary Examiner* — Giovanna C Wright
(74) *Attorney, Agent, or Firm* — Oblon, McClelland, Maier & Neustadt

(57) ABSTRACT

A control system for actuating a drill pipe rack is provided. The drill pipe rack moves between a first position and a second position. The control system includes a first actuator to actuate a top end of the drill pipe rack and a second actuator to actuate a bottom end of the drill pipe rack. The control system includes a pump to supply pressurized fluid to the first actuator and the second actuator. The control system further includes at least one volumetric flow divider in fluid communication with the pump. The volumetric flow divider is configured to supply equal volumetric quantity of the pressurized fluid to the first actuator and the second actuator, and subsequently move the drill pipe rack between the first position and the second position.

20 Claims, 5 Drawing Sheets

CONTROL SYSTEM FOR ACTUATING DRILL PIPE RACK

TECHNICAL FIELD

The present disclosure relates to a drill pipe rack for a blasthole drilling rig. More particularly, the present disclosure relates to a control system for the drill pipe rack.

BACKGROUND

Drilling systems are generally known to include a vertical drill tower (e.g. mast, etc.) constructed from structural members such as steel beams and reinforcing supports. The drill tower is often coupled to a mobile platform (e.g. which along with other components typically form a drilling rig) for positioning the drill tower in a desired location to conduct a drilling operation. The drill tower is often equipped with a drill carousel which is structured and adapted to support a drill string formed from a combination of pipe segments (e.g., drill pipes, drill rods, drill extenders, etc.). The drill carousel is used to selectively add the pipe segments to the drill string for drilling a hole having a desired depth. The drill carousel is intended to allow a drilling operation to progress into the drill hole by making readily available a continuous string of pipe segments as needed for advancing a drilling tool into a drill hole.

Throughout the drilling operation, it is often desirable or necessary to add or remove a pipe segment from the drill string in order to meet a desired drilling depth, such as a depth that is greater or deeper than the depth restricted by the length of the drill tower. To minimize downtime in the drilling operation due to adding or removing a pipe segment, systems and mechanisms may be provided to facilitate moving the drill carousel to a change-out position and adding or removing pipe segments from the drill string. Typically, a drill pipe rack is used to store drill pipes on the mast. The drill pipe rack may be coupled to the mast and may be actuated between an operational position and a storage position to add or remove a drill pipe from the drill string. The drill pipe rack is in contact with the drill pipe at ends of the drill pipe.

For the drill pipe rack to function efficiently, it is vital that both the ends of the drill pipe move in tandem with each other. A support pipe structure extends along a length of the drill pipe and supports actuation mechanisms near both the ends of the drill pipe. The support pipe ensures a symmetric actuation of both the ends of the drill pipe. However, the support pipe is typically very heavy and adds a lot of weight to the drilling system. As the drilling system needs to be transported, and requires frequent position and inclination changes, movement of such a heavy weight adds a lot of operational cost to the overall drilling system.

Therefore, there is a need for an improved drill pipe rack which may overcome the problems described above.

SUMMARY

In an aspect of the present disclosure, a control system for actuating a drill pipe rack is provided. The drill pipe rack moves between a first position and a second position. The control system includes a first actuator to actuate a top end of the drill pipe rack and a second actuator to actuate a bottom end of the drill pipe rack. The control system includes a pump to supply pressurized fluid to the first actuator and the second actuator. The control system further includes at least one volumetric flow divider fluidly coupled to the pump. The volumetric flow divider supplies equal volumetric quantity of the pressurized fluid to the first actuator and the second actuator, and subsequently moves the drill pipe rack between the first position and the second position.

In another aspect of the present disclosure, a drill pipe rack for a blasthole drilling is provided. The drill pipe rack stores at least one drill pipe. The drill pipe has a first end and a second end. The drill pipe rack includes a top end supporting the first end of the drill pipe. The drill pipe rack includes a bottom end supporting the second end of the drill pipe. The drill pipe extends away from the bottom end towards the top end. The drill pipe rack includes an actuating mechanism to actuate the drill pipe rack between a first position and a second position. The drill pipe rack further includes a control system for controlling the actuating mechanism. The control system includes a first actuator to actuate the top end of the drill pipe rack and a second actuator adapted to actuate a bottom end of the drill pipe rack. The control system includes a pump to supply pressurized fluid to the first actuator and the second actuator. The control system further includes at least one volumetric flow divider in fluid communication with the pump. The volumetric flow divider supplies equal volumetric quantity of the pressurized fluid to the first actuator and the second actuator, and subsequently moves the drill pipe rack between the first position and the second position.

In yet another aspect of the present disclosure, a blasthole drilling rig including a mast is provided. The blasthole drill includes a drill pipe rack coupled to the mast. The drill pipe rack stores at least one drill pipe. The drill pipe rack includes a top end supporting the first end of the drill pipe, and a bottom end supporting the second end of the drill pipe. The drill pipe extends away from the bottom end towards the top end. The drill pipe rack includes an actuating mechanism to actuate the drill pipe rack between a first position and a second position. The drill pipe rack further includes a control system for controlling the actuating mechanism. The control system includes a first actuator to actuate the top end of the drill pipe rack and a second actuator adapted to actuate a bottom end of the drill pipe rack. The control system includes a pump to supply pressurized fluid to the first actuator and the second actuator. The control system further includes at least one volumetric flow divider in fluid communication with the pump. The volumetric flow divider supplies equal volumetric quantity of the pressurized fluid to the first actuator and the second actuator, and subsequently moves the drill pipe rack between the first position and the second position.

DETAILED DESCRIPTION

Wherever possible, the same reference numbers will be used throughout the drawings to refer to same or like parts.

Figure 1:
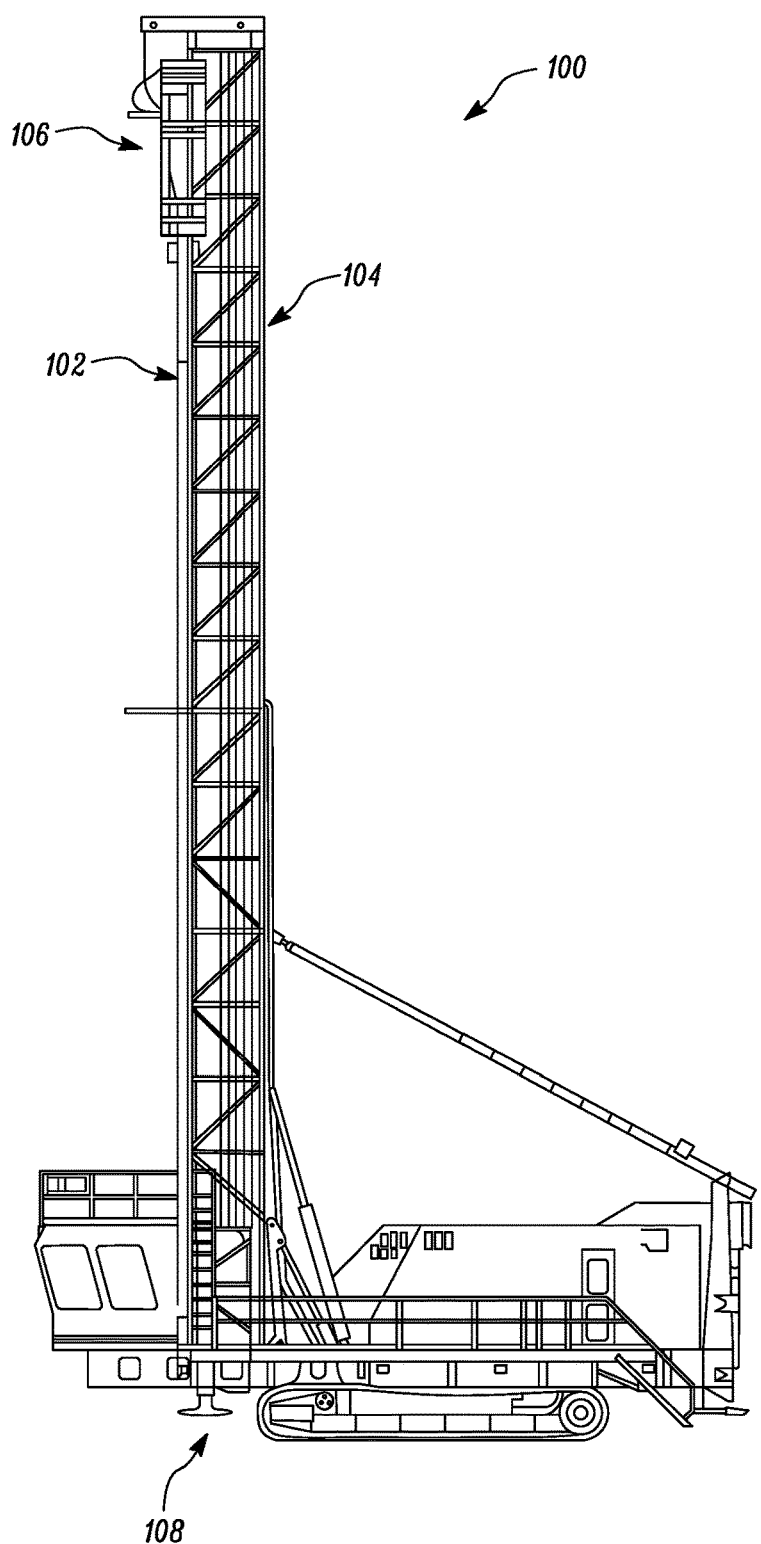
FIG. 1 illustrates a blasthole drill rig, in accordance with an embodiment of the present disclosure.

FIG. 1 illustrates a blasthole drilling rig 100 (hereinafter referred to as a drilling rig 100). The drilling rig 100 includes a drill string 102 coupled to a mast 104. The drill string 102 includes one or more drill pipes coupled to each other for extending the length of the drill string 102 in order to meet the desired drilling depth. The drill pipes may be coupled on a first end to a drill head 106 and on a second end to a drill tool 108 by one or more adapters (not shown). The drill string 102 is configured to apply a downward force to a drilling surface, driving the drill tool 108 into the drilling surface as per application requirements.

Figure 2:
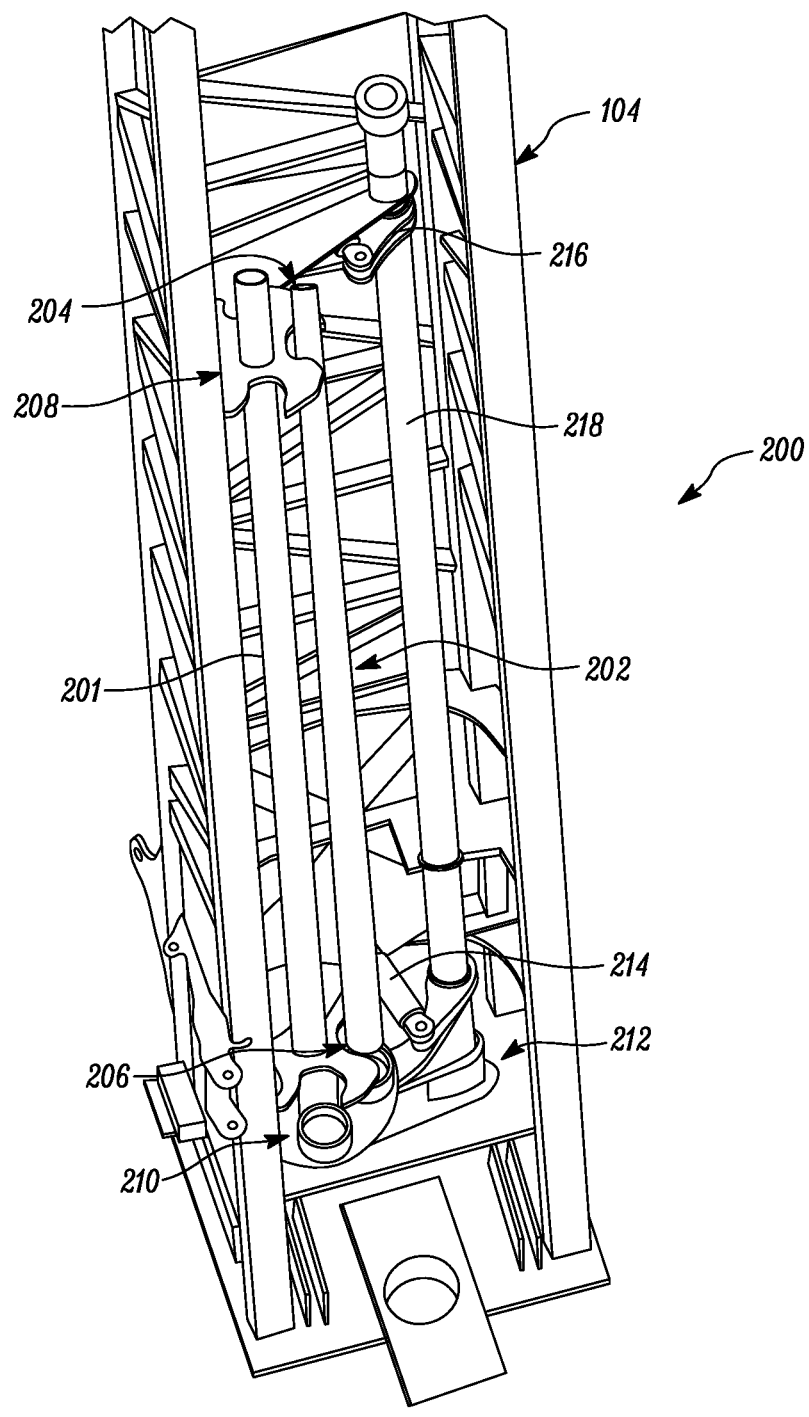
FIG. 2 illustrates a drill pipe rack actuation system being conventionally used in prior art.

FIG. 2 shows a drill pipe rack 200 according to a conventional arrangement known in prior art. The drill pipe rack 200 is coupled to the mast 104 such that the drill pipe rack 200 may store multiple drill pipes. The drill pipe rack 200 includes a carousal structure 201. In the illustrated embodiment, the drill pipe rack 200 is shown as storing one drill pipe 202. However, it should be contemplated that the drill pipe rack 200 may store any number of drill pipes 202 based on application requirements. The drill pipe 202 extends between a first end 204 of the drill pipe 202 and a second end 206 of the drill pipe 202. The drill pipe rack 200 has a top end 208 and a bottom end 210. The top end 208 of the drill pipe rack 200 supports the first end 204 of the drill pipe 202 and the bottom end 210 of the drill pipe rack 200 supports the second end 206 of the drill pipe 202.

Figure 3:
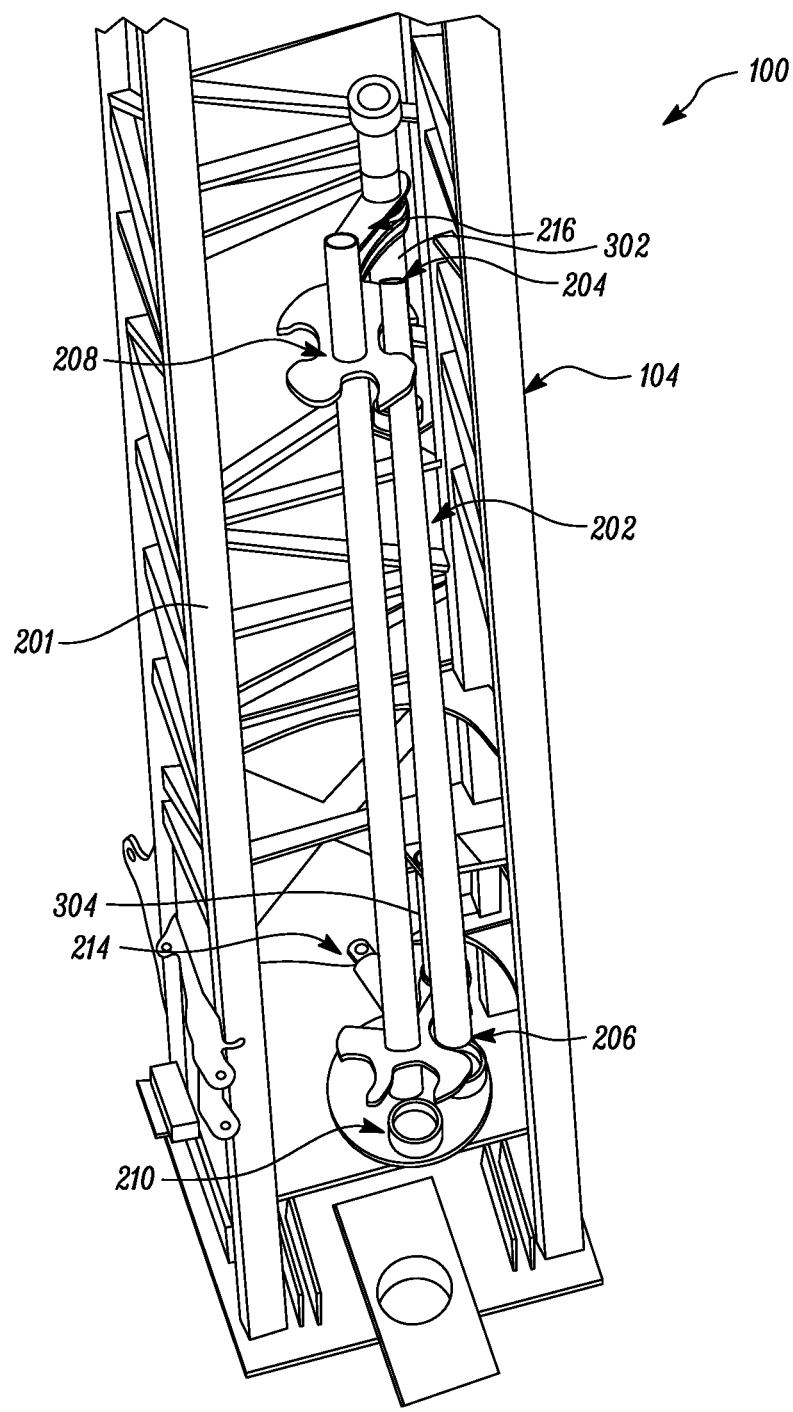
FIG. 3 illustrates a drill pipe rack in a first position, in accordance with an embodiment of the present disclosure.
Figure 4:
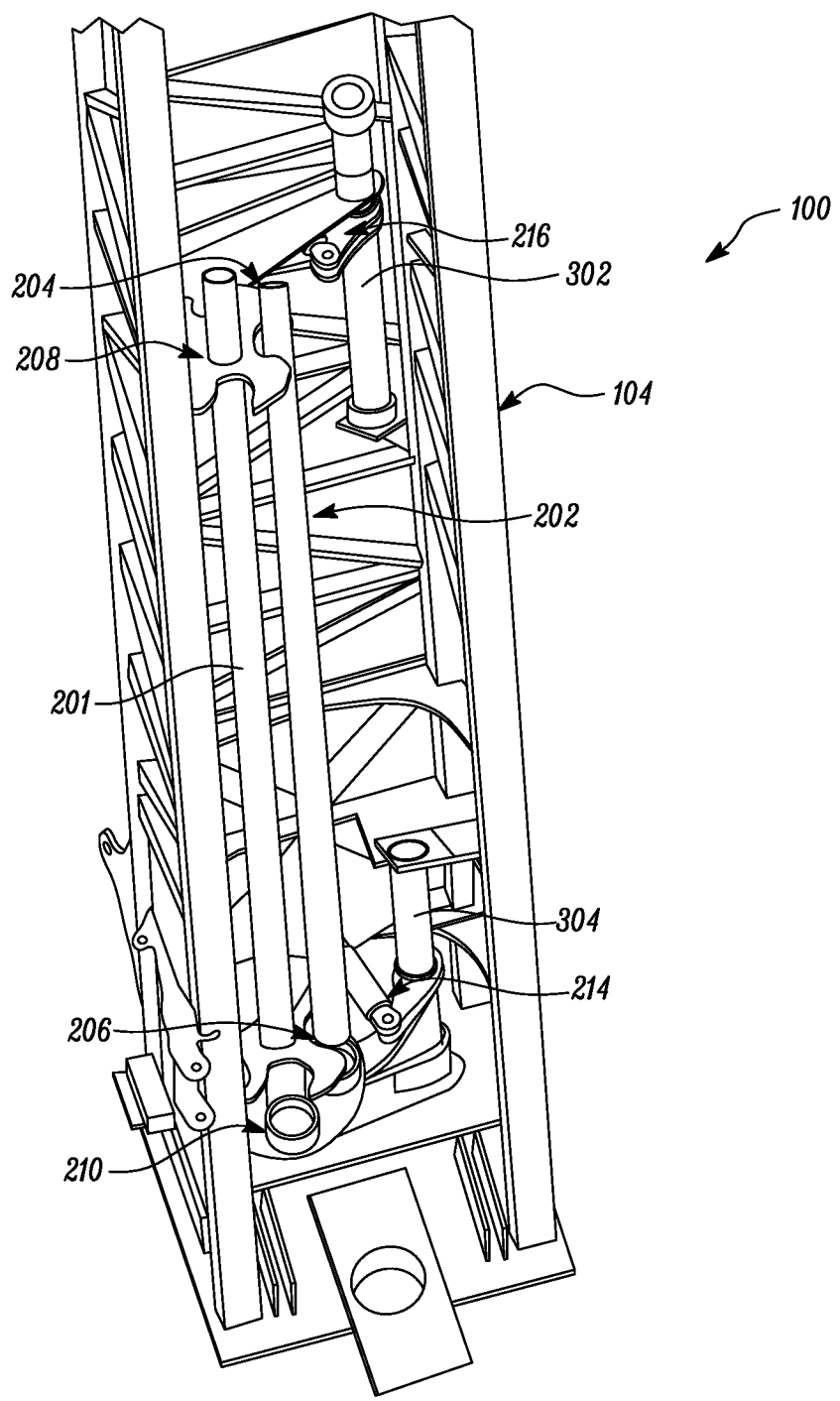
FIG. 4 illustrates a drill pipe rack in a second position, in accordance with an embodiment of the present disclosure.

The drill pipe rack 200 may rotate about the mast 104 between a first position (shown in FIG. 3) and a second position (shown in FIG. 4). The first position and the second position may be referred to as an operational position and a storage position respectively. The operational position of the drill pipe rack 200 may be defined as a configuration of the drill pipe rack 200 such that the drill pipe rack 200 may supply one of the drill pipes 202 stored on the drill pipe rack 200 to the drill string 102. The storage position of the drill pipe rack 200 may be defined as a configuration of the drill pipe rack 200 such that the drill pipe rack 200 is away from the drill string 102, and does not offer any obstruction to the drilling operation.

The drill pipe rack 200 includes an actuating mechanism 212 to actuate the drill pipe rack 200 between the first position and the second position based on application requirements. The actuating mechanism 212 may be any type of an actuating mechanism. In an embodiment, the actuation mechanism 212 is a hydraulic actuation mechanism. The actuating mechanism 212 includes a first actuator 214 and a second actuator 216. The first actuator 214 and the second actuator 216 may be hydraulically actuated piston-cylinder assemblies. The first actuator 214 and the second actuator 216 may be any other type of actuators as well which may suit the need of the present disclosure.

The prior art arrangement shown in FIG. 2 includes a support pipe 218 to ensure symmetric actuation of the drill pipe rack 200 between the first position and the second position. The first actuator 214 and the second actuator 216 are coupled to the support pipe 218. The support pipe 218 provides a reference position to the first actuator 214 and the second actuator 216 such that the top end 208 and the bottom end 210 of the drill pipe rack 200 actuate symmetrically and prevent any damage to the drill pipe rack 200 due to twisting, bending etc. due to asymmetric movements of the first actuator 214 and the second actuator 216 of the drill pipe rack 200.

FIGS. 3 and 4 illustrate the drill pipe rack 200 according to the present disclosure. FIG. 3 shows the drill pipe rack 200 in the first position and the FIG. 4 shows the drill pipe rack 200 in the second position. With combined reference to FIGS. 3 and 4, the drill pipe rack 200 includes a first support pipe 302 and a second support pipe 304 provided near the top end 208 and the bottom end 210 of the drill pipe rack 200 respectively. The first support pipe 302 may provide support to the top end 208 of the drill pipe rack 200 and the second support pipe 304 may provide support to the bottom end 210 of the drill pipe rack 200. The drill pipe rack 200 may also include various other structural components which are not being discussed here as the present disclosure is not limited by such components in any manner.

Figure 5:
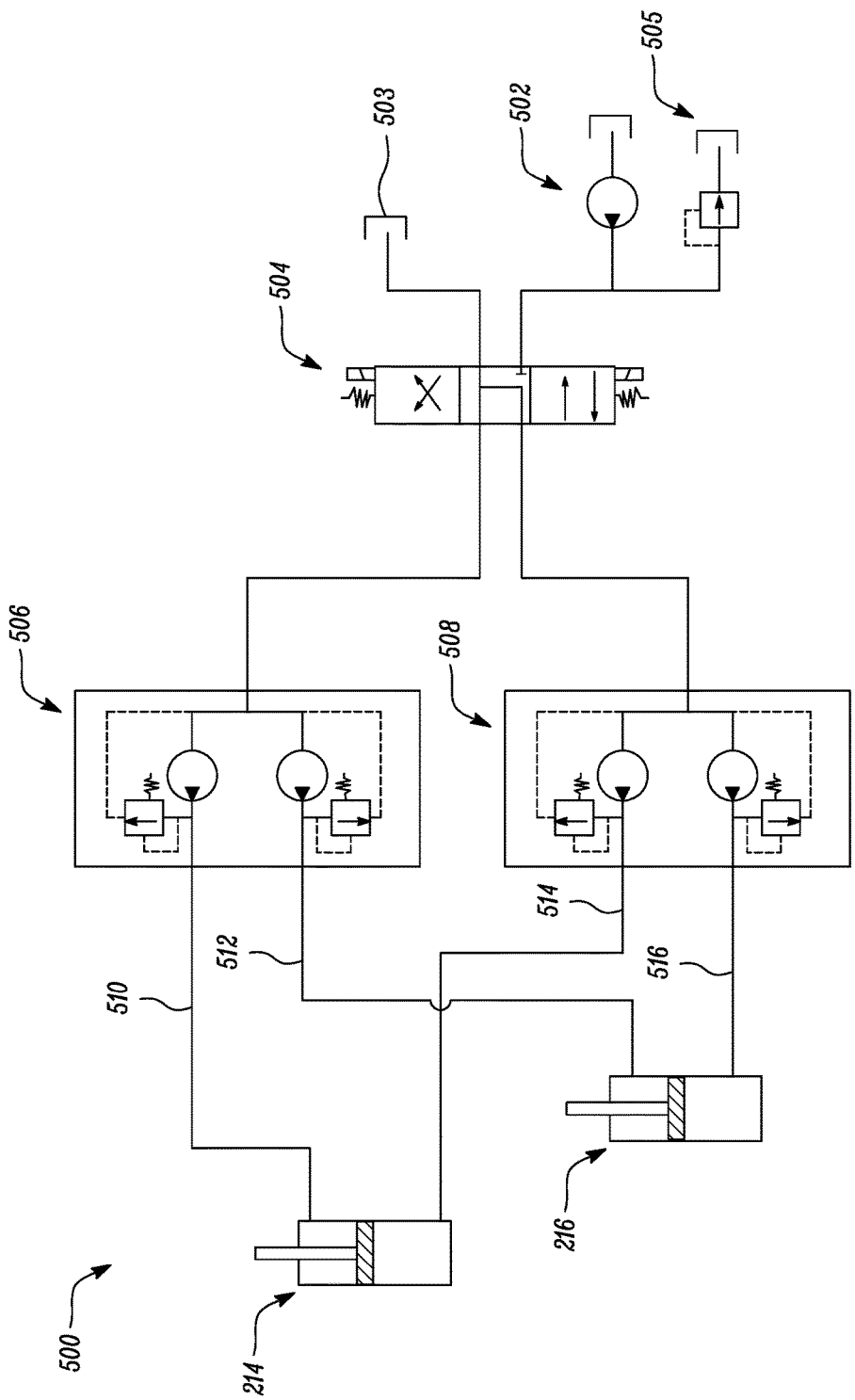
FIG. 5 illustrates a control system for controlling actuation of the drill pipe rack, in accordance with an embodiment of the present disclosure.

As the first support pipe 302 and the second support pipe 304 are two separate structural components, the present disclosure provides a control system 500 (shown in FIG. 5) for symmetrically actuating the top end 208 and the bottom end 210 of the drill pipe rack 200 to ensure efficient functioning of the drill pipe rack 200. FIG. 5 schematically illustrates the control system 500 for the actuation mechanism 212 of the drill pipe rack 200. The control system 500 includes the first actuator 214 which actuates the top end 208 of the drill pipe rack 200, and the second actuator 216 which actuates the bottom end 210 of the drill pipe rack 200.

The control system 500 includes a pump 502 which supplies pressurized fluid to the first actuator 214 and the second actuator 216 to actuate the top end 208 and the bottom end 210 of the drill pipe rack 200 respectively. In an embodiment, the pump 502 is a fixed displacement pump. In another embodiment, the pump 502 is a gear type fixed displacement pump. The pump 502 receives hydraulic fluid from a source of hydraulic fluid and supplies pressurized fluid to the first actuator 214 and the second actuator 216. A reservoir 503 and a pressure relief valve 505 are also provided in the control system 500. A control valve 504 is fluidly coupled to the pump 502 downstream of the pump 502.

The control system 500 further includes at least one volumetric flow divider in fluid communication with the pump 502. In the embodiment illustrated in FIG. 5, the control system 500 includes a first volumetric flow divider 506 and a second volumetric flow divider 508. The first volumetric flow divider 506 receives pressurized fluid from the pump 502 through the control valve 504, and supplies the pressurized fluid to the first actuator 214 and the second actuator 216. The first volumetric flow divider 506 supplies pressurized fluid to the first actuator 214 and the second actuator 216 in equal volumetric quantities. The first volumetric flow divider 506 may include a combination of valves and hydraulic motor which may provide equal volumes of pressurized fluid to both the first actuator 214 and the second actuator 216.

The second volumetric flow divider 508 is identical to the first volumetric flow divider 506. The second volumetric flow divider 508 receives pressurized fluid from the pump 502 through the control valve 504, and supplies the pressurized fluid to the first actuator 214 and the second actuator 216. The second volumetric flow divider 508 supplies pressurized fluid to the first actuator 214 and the second actuator 216 in equal volumetric quantities. The second volumetric flow divider 508 may include a combination of valves and hydraulic motor which may provide equal volumes of pressurized fluid to both the first actuator 214 and the second actuator 216.

The first volumetric flow divider 506 supplies the pressurized fluid to the first actuator 214 and the second actuator 216 to extend the first actuator 214 and the second actuator 216, and subsequently move the drill pipe rack 200 in the first position. Volumetric quantity of the pressurized fluid supplied to the first actuator 214 and the second actuator 216 may determine an extent of actuation of the first actuator 214 and the second actuator 216. The control system 500 further includes a first hose 510 to supply the pressurized fluid from the first volumetric flow divider 506 to the first actuator 214 and a second hose 512 to supply the pressurized fluid from the first volumetric flow divider 506 to the second actuator 216. The first hose 510 and the second hose 512 may be any conventional type of a hose which may be suitable for application in various aspects of the present disclosure.

Similarly, the second volumetric flow divider 508 supplies the pressurized fluid to the first actuator 214 and the second actuator 216 to retract the first actuator 214 and the second actuator 216, and subsequently move the drill pipe rack 200 in the second position. Volumetric quantity of the pressurized fluid supplied to the first actuator 214 and the second actuator 216 determines an extent of retraction of the first actuator 214 and the second actuator 216. The control system 500 further includes a third hose 514 to supply the pressurized fluid from the second volumetric flow divider 508 to the first actuator 214 and a fourth hose 516 to supply the pressurized fluid from the second volumetric flow divider 508 to the second actuator 216. The third hose 514 and the fourth hose 516 may be any conventional type of a hose which may be suitable for application in various aspects of the present disclosure.

To actuate the drill pipe rack 200 between the first position and the second position, the pump 502 supplies the pressurized fluid to the control valve 504. Based on the application requirements, the control valve 504 distributes the pressurized fluid between the first volumetric flow divider 506 and the second volumetric flow divider 508. The first volumetric flow divider 506 provides the pressurized fluid in equal volumetric quantities to the first actuator 214 through the first hose 510 and the second actuator 216 through the second hose 512. Supply of the pressurized fluid from the first volumetric flow divider 506 extends the first actuator 214 and the second actuator 216, and subsequently actuates the drill pipe rack 200 so that the drill pipe rack 200 moves towards the first position.

Similarly, the second volumetric flow divider 508 provides the pressurized fluid in equal volumetric quantities to the first actuator 214 through the third hose 514 and the second actuator 216 through the fourth hose 516. Supply of the pressurized fluid from the second volumetric flow divider 508 retracts the first actuator 214 and the second actuator 216, and subsequently actuates the drill pipe rack 200 so that the drill pipe rack 200 moves towards the second position. The first actuator 214 and the second actuator 216 receive equal volumetric quantities of pressurized fluid while being extended or being retracted. Equal volumetric quantities of pressurized fluid ensure equal extent of actuation of the top end 208 and the bottom end 210 of the drill pipe rack 200, while being extended or being retracted.

INDUSTRIAL APPLICABILITY

The present disclosure provides an improved means of actuating the drill pipe rack 200 through the control system 500. The drill pipe rack 200 has the top end 208 and the bottom end 210. The top end 208 is actuated by the first actuator 214 and the bottom end 210 is actuated by the second actuator 216. The first actuator 214 and the second actuator 216 are supplied with equal volumetric quantities of pressurized fluid by the first volumetric flow divider 506 and the second volumetric flow divider 508 for extension and retraction of the first actuator 214 and the second actuator 216 respectively. Equal volumetric quantities of the pressurized fluid ensure symmetric actuation of the top end 208 and the bottom end 210 of the drill pipe rack 200, and prevent any damage to the drill pipe rack 200.

The present disclosure also eliminates the used of the support pipe 218 being used in prior art arrangements to ensure symmetric actuation of the top end 208 and the bottom end 210 of the drill pipe rack 200. The support pipe 218 is replaced by the first support pipe 302 and the second support pipe 304. Combined weight of the first support pipe 302 and the second support pipe 304 is considerably lesser than weight of the support pipe 218. Overall weight of the drilling rig 100 is reduced by a considerable amount which leads to substantial savings in terms of cost as well as time as amount of fuel and power required to transport, and positional changes of the drilling rig 100 is substantially lesser than that required in prior art arrangements. Thus, the present disclosure improves overall efficiency and reduces operational costs of the drilling rig 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system configured to actuate a drill pipe rack, the drill pipe rack adapted to move between a first position and a second position, the control system comprising:
    a first actuator configured to actuate a top end of the drill pipe rack, the first actuator being supported by a first vertical support pipe;
    a second actuator configured to actuate a bottom end of the drill pipe rack, the second actuator being supported by a second vertical support pipe;
    a pump configured to supply pressurized fluid to the first actuator and the second actuator; and
    at least one volumetric flow divider fluidly coupled to the pump, wherein the volumetric flow divider is configured to supply equal volumetric quantity of the pressurized fluid to the first actuator and the second actuator, and subsequently move the drill pipe rack between the first position and the second position,
    wherein the first vertical support pipe is distinct from the second vertical support pipe, and the first vertical support pipe is separated from the second vertical support pipe in a vertical direction.

2. The control system of claim 1, wherein the at least one volumetric flow divider includes a first volumetric flow divider and a second volumetric flow divider.

3. The control system of claim 2, wherein the first volumetric flow divider supplies pressurized fluid to the first and second actuators to extend the first and second actuators, and subsequently move the drill pipe rack to the first position.

4. The control system of claim 2, wherein the second volumetric flow divider supplies pressurized fluid to the first and second actuators to retract the first and second actuators, and subsequently move the drill pipe rack to the second position.

5. The control system of claim 2, further comprising a control valve fluidly coupled to the pump, wherein the control valve selectively allows flow of the pressurized fluid between the first volumetric flow divider and the second volumetric flow divider.

6. The control system of claim 1, further comprising a first hose to supply the pressurized fluid from the volumetric flow divider to the first actuator.

7. The control system of claim 6, further comprising a second hose to supply the pressurized fluid from the volumetric flow divider to the second actuator.

8. The control system of claim 1, wherein the first position of the drill pipe rack is a storage position, and the second position of the drill pipe rack is an operational position.

9. The control system of claim 1, wherein the first and second actuators comprise of hydraulically actuated piston-cylinder assembly.

10. A drill pipe rack for a blasthole drilling rig to store at least one drill pipe, the drill pipe having a first end and a second end, the drill pipe rack comprising:
   a top end supporting the first end of the drill pipe;
   a bottom end supporting the second end of the drill pipe, wherein the drill pipe extends away from the bottom end towards the top end;
   an actuating mechanism configured to actuate the drill pipe rack between a first position and a second position; and
   a control system configured to control the actuating mechanism, the control system comprising:
      a first actuator configured to actuate the top end of the drill pipe rack, the first actuator being supported by a first support pipe;
      a second actuator configured to actuate a bottom end of the drill pipe rack, the second actuator being supported by a second support pipe;
      a pump configured to supply pressurized fluid to the first actuator and the second actuator; and
      at least one volumetric flow divider fluidly coupled to the pump, wherein the volumetric flow divider is configured to supply equal volumetric quantity of the pressurized fluid to the first actuator and the second actuator, and subsequently move the drill pipe rack between the first position and the second position,
      wherein the first support pipe is distinct from the second support pipe, and the first support pipe is separated from the second support pipe in a vertical direction.

11. The drill pipe rack of claim 10, wherein the at least one volumetric flow divider includes a first flow divider and a second flow divider.

12. The drill pipe rack of claim 11, wherein the first volumetric flow divider supplies pressurized fluid to the first and second actuators to extend the first and second actuators, and subsequently move the drill pipe rack to the first position.

13. The drill pipe rack of claim 11, wherein the second volumetric flow divider supplies pressurized fluid to the first and second actuators to retract the first and second actuators, and subsequently move the drill pipe rack to the second position.

14. The drill pipe rack of claim 11, further comprising a control valve fluidly coupled to the pump, wherein the control valve selectively allows flow of the pressurized fluid between the first volumetric flow divider and the second volumetric flow divider.

15. The drill pipe rack of claim 11, wherein the pump is a fixed displacement pump.

16. The drill pipe rack of claim 10, further comprising:
   a first hose to supply the pressurized fluid from the volumetric flow divider to the first actuator; and
   a second hose to supply the pressurized fluid from the volumetric flow divider to the second actuator.

17. The drill pipe rack of claim 10, wherein the first support pipe is aligned with the second support pipe in the vertical direction along a same vertical axis.

18. The drill pipe rack of claim 10, wherein the first position of the chill pipe rack is a storage position, and the second position of the drill pipe rack is a operational position.

19. The drill pipe rack of claim 10, wherein the first and second actuators comprise of hydraulically actuated piston-cylinder assembly.

20. A blasthole drilling rig comprising:
   a mast; and
   a drill pipe rack coupled to the mast, the drill pipe rack adapted to store at least one drill pipe, the drill pipe rack including:
      a top end supporting the first end of the drill pipe;
      a bottom end supporting the second end of the drill pipe, wherein the drill pipe extends away from the bottom end towards the top end;
      an actuating mechanism configured to actuate the chill pipe rack between a first position and a second position; and
      a control system configured to control the actuating mechanism, the control system comprising:
         a first actuator configured to actuate the top end of the drill pipe rack, the first actuator being supported by a first support pipe;
         a second actuator configured to actuate a bottom end of the drill pipe rack, the second actuator being supported by a second support pipe;
         a pump configured to supply pressurized fluid to the first actuator and the second actuator; and
         at least one volumetric flow divider fluidly coupled to the pump, wherein the volumetric flow divider is configured to supply equal volumetric quantity of the pressurized fluid to the first actuator and the second actuator, and subsequently move the drill pipe rack between the first position and the second position,
         wherein the first support pipe is distinct from the second support pipe, and the first support pipe is separated from the second support pipe in a vertical direction.

* * * * *